No. 746,410. PATENTED DEC. 8, 1903.
G. F. TURNER.
UNIFORM FEED MECHANISM FOR WEIGHING OR PACKAGING MACHINES.
APPLICATION FILED JUNE 6, 1903.
NO MODEL.

WITNESSES:
George P. Dibe.
Alice H. Morrison.

INVENTOR:
George F. Turner
by Wm. A. Copeland
attorney

No. 746,410. Patented December 8, 1903.

UNITED STATES PATENT OFFICE.

GEORGE F. TURNER, OF NEW YORK, N. Y., ASSIGNOR TO PNEUMATIC SCALE CORPORATION, OF PORTLAND, MAINE, A CORPORATION OF MAINE.

UNIFORM-FEED MECHANISM FOR WEIGHING OR PACKAGING MACHINES.

SPECIFICATION forming part of Letters Patent No. 746,410, dated December 8, 1903.

Application filed June 6, 1903. Serial No. 160,305. (No model.)

*To all whom it may concern:*

Be it known that I, GEORGE F. TURNER, of New York, in the county of Kings and State of New York, have invented certain new and useful Improvements in Uniform-Feed Mechanism for Weighing or Packaging Machines, of which the following is a specification.

When goods are fed through a hopper to another receptacle—as, for instance, in a weighing or packaging machine—it is desirable that there should be a uniform rate of feed in order that when the outlet-valve closes the quantity of goods left in suspense below the valve shall be as nearly as possible uniform to insure accuracy of weight. It is sometimes difficult to secure such uniformity of feed.

The object of the present invention is to so construct a hopper as to insure a uniform rate of feed and without mutilating the beans or berries, the invention being specially intended for application to machines in which the material to be fed consists of whole beans or berries, such as coffee-beans, peas, or the like.

The invention will now be fully described by reference to the accompanying drawings, and the novel features thereof will be particularly pointed out in the claims at the close of the specification.

Figure 1:
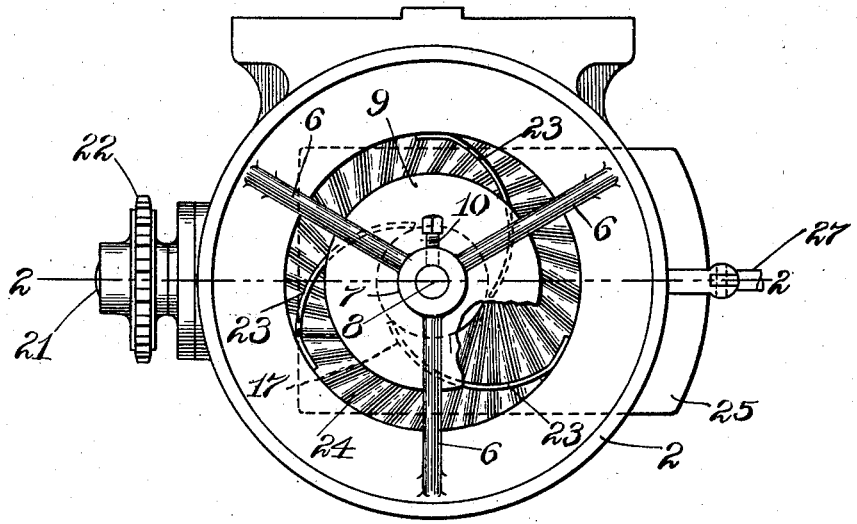
Figure 2:
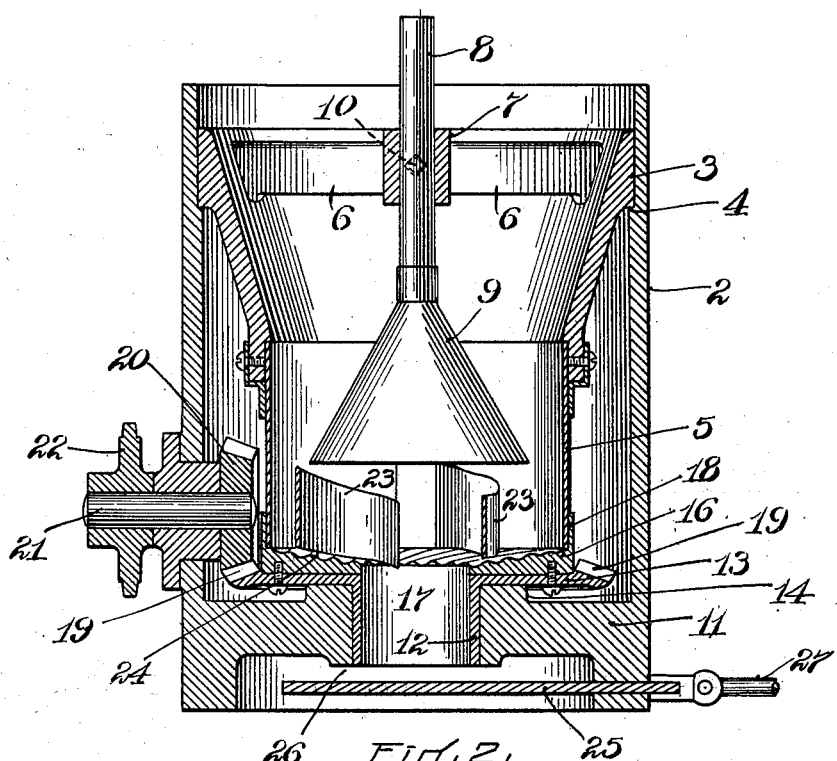

In the drawings, Figure 1 is a top plan view of a hopper and feed embodying the invention. Fig. 2 is a vertical central section on line 2 2 of Fig. 1, the cone being shown in full lines.

The hopper 1 is mounted in a casing or box 2, being shown as supported therein by a flange 3 on the hopper resting on a shoulder 4 on the inner wall of the casing 2. The hopper is shown as made in two parts, the upper or flaring portion 1 being a casting and the lower cylindrical portion 5, of sheet metal, bolted or riveted to the casting. Projecting radially inward from the interior of the hopper, in the upper part thereof, are arms 6, which at their inner ends are connected with a sleeve 7. Passing through the sleeve 7 is a rod 8, on the lower end of which is secured the cone deflector 9. A binding-screw 10, passing through the side of sleeve 7 and bearing against the rod 8, holds the cone spreader in position.

The bottom 11 of the casing 2 has a central aperture through it, and fitting in said aperture is the hollow hub 12 of a rotary plate or wheel 13, which rests on an annular shoulder 14 around the inner side of the bottom 11 of the casing. Secured to the upper side of the rotary plate 13, as by screws 15, is a rotary disk 16, having a central hole which registers with the opening 17 through the hollow hub 12. The upper side of the disk 16 is dished or formed with a decline from the outer edge to the opening and is also corrugated, the corrugations 24 extending transversely at or nearly at right angles to the vertical stationary guides 23. Rising from the disk 16 around the outer edge is an annular flange 18, which goes outside of the lower end of the cylindrical lower portion 5 of the hopper and fits just loosely enough to permit rotation of the disk 16. The outer periphery of the disk 16 is formed with bevel-teeth 19, which engage with a bevel-toothed pinion 20, mounted on a shaft 21, driven by a sprocket-wheel 22 or other suitable means, whereby the wheel 13 and its attached disks 16 are rotated.

Secured to the inner sides of the cylindrical portion 5 of the hopper are vertical curved guides 23, arranged spirally, which just clear the corrugated upper surface of the disk 16 and extend inwardly to the edge of the opening in the disk substantially at right angles to the line of the corrugations.

As the material is fed into the hopper from above it is guided by the cone deflector 9 so that it falls upon the corrugated surface of the disk 16 between the vertical curved guides 23 and the cylinder 5. As the disk 16 rotates in the direction of the arrow, Fig. 1, the material will come in contact with the stationary guides 23 and be carried to the central opening in the disk and fall down through the passage 17 through the hollow hub 12. The centrally-sloping surface of the disk 16 aids in guiding the material to the opening, and the corrugations furnish trough-like ways for the material. The arrangement of the spiral guides, which cross the corrugations at substantially right angles, causes the obstruction of the guides when the disk 16 rotates to act upon the beans or other material in direct line with the corrugations, so that the material is carried toward the center. The corrugations are preferably arranged eccentrically instead of radially, because such arrangement is found in practice to be most efficient.

The reciprocable slide 25, which closes the passage from the chamber 26 below the hopper, is connected with a rod 27 and may be actuated by suitable and well-known mechanism to open and close the outlet. Such mechanism is not shown in the drawings, as it forms no part of the present invention.

What I claim is—

1. In combination with a hopper, a centrally-apertured rotary bottom therefor, corrugations on the upper face of said bottom forming guides which lead from the periphery inward to said central opening, and mechanism for rotating said bottom, substantially as described.

2. In combination with a hopper, a rotary bottom therefor having a central opening therethrough and having on its upper face corrugations forming troughs leading from the periphery inward, and sloping downwardly toward the said opening, and mechanism for rotating said bottom, substantially as described.

3. In combination with a hopper, a rotary bottom therefor having a central hole therein, mechanism for rotating said bottom relatively to the sides of the hopper, and guides leading from the sides of the hopper toward said central opening in the bottom, substantially as described.

4. In combination with a hopper, a rotary bottom therefor, a central opening therein, mechanism for rotating said bottom relatively to the sides of said hopper, corrugations on the upper face of said bottom leading from the periphery toward said central opening, and upright guides curved in horizontal section extending from the sides of said hopper just above the bottom toward said central opening, substantially as described.

5. In combination with a fixed hopper, a cone deflector centrally located therein, a rotary bottom for said hopper, a central opening in said bottom, mechanism for rotating said bottom, corrugations on the upper face of said bottom leading from the periphery inward, toward said central opening, and upright guides extending from the sides of said hopper just above the bottom toward said central opening, substantially as described.

6. In combination with a hopper, a rotary bottom therefor, a central opening in said bottom, corrugations in the upper face of said bottom leading from the periphery toward said opening, said corrugations being formed eccentrically with relation to the center of said bottom, and mechanism for rotating said bottom, substantially as described.

In testimony whereof I have affixed my signature in presence of two witnesses.

GEORGE F. TURNER.

Witnesses:
 J. A. DAVISON,
 JOHN A. E. WARD.